United States Patent
Partridge et al.

(10) Patent No.: US 10,156,114 B2
(45) Date of Patent: Dec. 18, 2018

(54) POPPET ASSEMBLY FOR USE IN A SUBSEA CONNECTION SYSTEM

(71) Applicant: TRENDSETTER ENGINEERING, INC., Houston, TX (US)

(72) Inventors: Jeffrey Partridge, Houston, TX (US); Brent Cox, Houston, TX (US)

(73) Assignee: TRENDSETTER ENGINEERING, INC., Houston, TX (US)

( * ) Notice: Subject to any disclaimer, the term of this patent is extended or adjusted under 35 U.S.C. 154(b) by 0 days.

(21) Appl. No.: 15/595,153

(22) Filed: May 15, 2017

(65) Prior Publication Data

US 2017/0328164 A1 Nov. 16, 2017

Related U.S. Application Data

(60) Provisional application No. 62/336,936, filed on May 16, 2016.

(51) Int. Cl.

| | |
|---|---|
| *F16L 37/28* | (2006.01) |
| *E21B 33/038* | (2006.01) |
| *E21B 29/12* | (2006.01) |
| *E21B 33/076* | (2006.01) |
| *F16L 37/30* | (2006.01) |
| *F16L 1/26* | (2006.01) |
| *F16L 37/00* | (2006.01) |
| *F16L 37/12* | (2006.01) |
| *F16L 37/35* | (2006.01) |
| *F16L 37/62* | (2006.01) |

(Continued)

(52) U.S. Cl.
CPC .......... *E21B 33/038* (2013.01); *E21B 29/12* (2013.01); *E21B 33/076* (2013.01); *F16L 1/26* (2013.01); *F16L 37/002* (2013.01); *F16L 37/121* (2013.01); *F16L 37/28* (2013.01); *F16L 37/30* (2013.01); *F16L 37/35* (2013.01); *F16L 37/62* (2013.01); *E21B 29/00* (2013.01); *E21B 33/00* (2013.01)

(58) Field of Classification Search
CPC . F16L 37/0985; F16L 37/0982; F16L 37/096; F16L 37/28; F16L 37/30; F16L 37/32; F16L 37/34; F16L 37/38; F16L 37/40; F16L 37/413; E21B 33/038; E21B 33/076; E21B 29/12
USPC .......... 137/614.03–614.05; 251/149.1, 149.6
See application file for complete search history.

(56) References Cited

U.S. PATENT DOCUMENTS

| | | | |
|---|---|---|---|
| 3,523,579 A | 8/1970 | Nelson | |
| 4,470,575 A * | 9/1984 | Stoll | F16L 37/133 251/149.6 |

(Continued)

*Primary Examiner* — Kevin Lee
(74) *Attorney, Agent, or Firm* — Egbert Law Offices, PLLC

(57) ABSTRACT

A subsea connection system for connecting to a hub has a body with an interior passageway, a collet having a plurality of collet segments, an outer sleeve overlying the collet, and a poppet valve assembly positioned within the interior passageway of the body. The plurality of collet segments are movable between a locked position and an unlocked position. The poppet valve assembly is movable between an open position and a closed position in which the open position allows a fluid to flow through the interior passageway and the closed position blocks a flow of fluid through the interior passageway. The outer sleeve is movable so as to cause the plurality of collet segments to join to a hub.

12 Claims, 12 Drawing Sheets

(51) Int. Cl.
*E21B 29/00* (2006.01)
*E21B 33/00* (2006.01)

(56) References Cited

U.S. PATENT DOCUMENTS

| | | |
|---|---|---|
| 4,477,105 A | 10/1984 | Wittman et al. |
| 4,693,497 A | 9/1987 | Pettus et al. |
| 4,708,376 A | 11/1987 | Jennings et al. |
| 5,365,972 A | 11/1994 | Smith, III |
| 5,927,683 A * | 7/1999 | Weh et al. .......... F16L 37/1215 251/149.6 |
| 6,267,419 B1 | 7/2001 | Baker et al. |
| 6,626,207 B1 | 9/2003 | Smith, III |
| 7,350,580 B1 | 4/2008 | Laureano |
| 8,398,052 B2 | 3/2013 | Spensson |
| 9,617,819 B2 * | 4/2017 | Older et al. .......... E21B 33/038 |
| 2004/0074541 A1 * | 4/2004 | Sharpe ............... H05K 7/20272 137/614.04 |
| 2009/0159824 A1 | 6/2009 | Tibbitts et al. |
| 2014/0361534 A1 | 12/2014 | Bekkevold |

* cited by examiner

POPPET ASSEMBLY FOR USE IN A SUBSEA CONNECTION SYSTEM

CROSS-REFERENCE TO RELATED APPLICATIONS

The present application claims priority from U.S. Provisional Patent Application Ser. No. 62/336,936, filed on May 16, 2016, and entitled "Poppet Assembly for Use in a Subsea Collet Connection System".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the connecting of external items to a subsea structure. More particularly, the present invention relates to collet-type connection systems. More particularly, the present invention relates to poppets as used in association with the collet-type connection system so as to either allow or block a flow of fluids through the system.

2. Description of Related Art Including Information Disclosed Under 37 CFR 1.97 and 37 CFR 1.98

Technology advances related to subsea petroleum exploration have resulted in the development of various conduit and wellhead connector mechanisms which may be remotely controlled for the purpose of achieving connection between mechanical and hydraulic apparatus of wellheads, conduits, and the like. A popular type of connector assembly is a hydraulically-actuated collet connector which utilizes a series of segment clamps which are biased by other mechanical apparatus to releasably secure a pair of abutting flanges into a sealed assembly. Collet connectors and other acceptable connector mechanisms are generally utilized for connection of the wellhead valve system with the production system of the wellhead so that the wellhead valve assembly may be disconnected and removed in the event that replacement or repair is necessary.

A multi-well subsea assembly can include subsea structures such a subsea trees, manifolds, and/or pipeline end terminations. These subsea structures can be interconnected by jumpers. The jumpers mate up with the subsea structures using connectors that mate with hubs on the subsea structures. Production is often routed from the trees in the gathering manifolds and from the gathering manifolds to pipeline end terminations and pipelines to the platform.

When dealing with subsea applications, it becomes necessary to simplify or eliminate the use of divers during the locking of a connector in order to secure the connection between the drilling or piping components in the wellhead. Hydraulically-actuated collet connectors have been developed and utilized for this purpose. These collet-type connectors are designed for high pressure in deepwater drilling operations. The collet connectors are secured over the mating sections of the drilling or piping components to be connected by use of hydraulic pressure. Because the hydraulic pressure can be controlled remotely, it is not necessary for divers to lock the collet connector in order to secure the connection.

There are several problems associated with existing collet connectors. First, and foremost, very skillful operators are required so as to bring the hub of a collet connector into a proper position with respect to the hub of the subsea structure. In certain circumstances, it is been known that the hubs can become damaged if the landing between the hubs is not carried out properly. Additionally, there is a possibility that the gasket between the hubs can become compromised if an improper engagement between the hubs is carried out. Additionally, in prior art collet connectors, the lead screw associated with the collet connectors is placed into the primary load path of the connection. As a result, additional force is required in order to achieve the proper connection. In prior art collet connector systems, it becomes difficult for the operators to properly view the connection while it is being carried out. Furthermore, prior art collet connector systems also have ineffective secondary removal capabilities. As such, a need has developed in association with collet connectors so as to allow the collet connector to be easily and properly installed with no possibility of damaging contact during the installation.

In order to allow for the proper connection and disconnection of hubs in the subsea environment, it is necessary to properly join such hubs in the subsea environment. Once the hubs are joined, then a liquid, chemical, or other fluid, can flow through the connector so as to be delivered to the tubing that is connected to the hubs or to a structure that is connected to one of the hubs. Under certain circumstances, it is desirable to release the connection of the hubs in the subsea environment. Unfortunately, when such hubs are disconnected, there will be a release of residual fluid into the subsea environment. This can produce environmental consequences. As such, a need has developed so as to be able to effectively close the interior passageways of the connected hubs upon the release of one hub from the other.

Subsea connectors are known that can be suitably connected through the use of a remotely-operated vehicle (ROV). Typically, the ROV will travel to the subsea structure, manipulate the hubs, and then apply a torque tool to the actuator of one of the connectors so as to achieve this connection. However, it would be desirable to avoid the need to use the ROV so as to achieve the proper connection. Importantly, it would be desirable to be able to send remote signals so as to carry out the necessary operations whereby the connector can be properly used and manipulated so as to connect the hubs.

In the past, various patents and patent application publications have issued with respect to collet-type connectors. For example, U.S. Pat. No. 3,523,579, issued on Aug. 11, 1970 to N. A. Nelson, describes a wellhead valve assembly which includes a plurality of hydraulically-actuated valves and an appropriate hydraulic fluid supply system for actuation of the valves. A hydraulically-actuated collet connector is provided for connecting production flow conduits and hydraulic fluid supply conduits to the wellhead valve assembly. The collet connector includes a means for remotely detecting leakage of production fluid or hydraulic fluid in the event that the joint between the wellhead valve assembly and the hydraulic collet connector should fail to properly seal.

U.S. Pat. No. 4,477,105, issued on Oct. 16, 1984 to Wittman et al., teaches a collet-actuated ball-and-socket connector. This connector is for connecting the ends of two pipes. A ball coupling member is adapted for connection to the end of one of the pipes. A retaining flange is freely disposed about the ball coupling member and engages the outer surface of the member. A socket coupling member is adapted for connection to the end of the other of the two pipes and provided for accepting the ball coupling member so as to provide a metal sealing ring for mating with the ball members. A collet locking means is mounted about the outer periphery of the socket coupling member and extends generally axially therefrom for permitting insertion of the ball coupling member in mating engagement with the socket coupling member when the collet means is open. An actuating means applies a predetermined axial force to the collet locking means for closing the collet means to engage the retaining flange and lock the ball-and-socket coupling members together in a sealed rigid relationship.

U.S. Pat. No. 4,693,497, issued on Sep. 15, 1987 to Pettus et al., describes a remotely-actuated collet connector which is suitable for joining tubular members with similar or different end preparations or profiles. The collet connector includes a housing to support the connector from a first tubular member, a plurality of collet fingers or segments mounted within the housing and around the exterior of the first tubular member, and an actuator ring surrounding the fingers to move the fingers to a release or latch position, and a pressure responsive means for moving the actuator ring. Each of the collet fingers has a first engaging surface and an adapter secured to the finger and also has a second engaging surface. The first engaging surface mates with the end profile of the first tubular member. The second engaging surface mates with the end profile of the second tubular member so that when the collet fingers are moved to the latch position they secure the first and second tubular members together.

U.S. Pat. No. 4,708,376, issued on Nov. 24, 1987 to Jennings et al., shows a collet-type connector having an upper body member having a plurality of collet segments, a cam ring movable relative to the upper body member to move the collet segments into a detachable connection with the connector of a subsea wellhead. The cam ring and the collet segments have sets of camming surfaces whereby a first set is cooperative to pivot the collet segments initially toward the wellhead and whereby a second set serves to urge the collet segments further to clamp the connector to the subsea wellhead. When the second set of camming surfaces function, the first set no longer functions to rotate the collet segments so as to reduce the power requirements for urging the collet segments into clamping engagement.

U.S. Pat. No. 6,267,419, issued on Jul. 31, 2001 to Baker et al., shows a remotely actuated clamping connector. The clamping connector includes clamp halves linked by a locking stem. The locking stem is forced into a pre-stressed state by moving the locking stem from a first relaxed position to a second pre-stressed position and retained in the second pre-stressed position by a locking collet. A locking collet through which the locking stem extends is moved from a first unlocked position to a second locked position wedged between the locking stem and one or the other of the clamp halves. When the locking collet is in the second locked position, it resists movement of the locking stem from the second pre-stressed position to the first relaxed position. The locking collet is then locked in the second locked position.

U.S. Patent Application Publication No. 2014/0361534, published on Dec. 11, 2014 to K. Bekkevold, describes a connector having a plurality of latching fingers arranged around a cylindrical body and having a central axis. Each finger has a first end region extending beyond an end of the body includes a first latching structure. Each finger is pivotally supported at an intermediate region by a portion of the body and is movable between a non-latching position and a latching position in which the first end region is closer to the central axis than in the non-latching position. The connector includes a first actuated member arranged in contact with a plurality of fingers and operable to move the fingers between the non-latching position and the latching position. An actuator is operable to force a second end region of each finger toward the body. The connector can be connected to a hub by bringing the connector face into contact with a hub face, moving the latching fingers toward the connector until the first latching structures are engaged in corresponding second latching structures on the hub, and then holding the latching structures together in a latching engagement.

A poppet valve is a valve typically used to control the flow of a fluid. The poppet valve consists of a hole, usually round or oval, and a tapered plug, usually a disc shape on the end of a shaft, often referred to as a "valve stem". The portion of the hole where the plug meets with it is referred to as the "seat" or "valve seat". The shaft guides the plug portion by sliding through a valve guide. The poppet valve is fundamentally different from slide or oscillating valves, instead of sliding or rocking over a seat to uncover a port, the poppet valve lifts from the seat with a movement perpendicular to the port. The main advantage of the poppet valve is that it has no movement on the seat, thus requiring no lubrication. Poppet valves are used in many industrial processes, from controlling the flow of milk to isolating sterile air in the semiconductor industry. However, they are most well-known for their use in internal combustion and steam engines.

Various patents have issued relating to the use of poppet valves in subsea applications. For example, U.S. Pat. No. 5,365,972, issued on Nov. 22, 1994 to R. E. Smith III, describes an undersea hydraulic coupling including a male member and a female member. Each of the members has a poppet valve biased to a closed position. At least one of the members has a bleed passage through the poppet valve and a bleed valve which opens to allow hydraulic fluid at high pressure to escape through a bleed passage until the pressure is below a predetermined amount.

U.S. Pat. No. 6,626,207, issued on Sep. 30, 2003 to R. E. Smith III, describes interlocking poppet valve actuators for undersea hydraulic coupling members. The actuators extend from the poppet valves of each coupling member and interlock to resist bending and/or other lateral displacement caused by hydraulic fluid flow and turbulence in the coupling member bores and at the junction between the coupling members.

U.S. Pat. No. 7,350,580, issued on Apr. 13, 2008 to M. Laureano, describes a subsea pass-through switching system so as to control fluid from a tubing hanger to a downhole completion of a subsea well. The coupling, located between a tubing hanging running tool and a downhole completion, includes a coupling body and a tubing hanger. A hydraulic poppet valve switches control fluid flow from a first flow path and a second flow path. The hydraulic poppet includes an isolation sleeve for opening and closing a first inlet port and second inlet port. At least two perimeter seals provides fluid isolation for the first flow path. A retainer seal seals the coupling body against the second inlet port. A retaining sleeve holds the coupling body against the tubing hanger.

First and second circumferential seals are located on opposite ends between the coupling body and the tubing hanger. The hydraulic poppet valve is adapted to move the perimeter seals and the retainer seal to open and close the first and second inlet ports.

U.S. Pat. No. 8,398,052, issued on Mar. 19, 2013 to A. N. Spensson, shows a subsea hydraulic coupler involving a subsea stab plate assembly having a stab plate which has apertures each extending in an axial direction through the plate from a front face of the plate to a rear face of the plate. A subsea hydraulic coupler has a body with an internal longitudinal passageway including a poppet valve operable to open the passageway on the mating of the coupler with a complementary coupler. The coupler is shaped for insertion through an aperture in either of two directions, each having a circumferential groove and a flange assembly including an axially-extending hub which fits into the groove and a shoulder for abutment against the front face of the plate.

U.S. Patent Application Publication No. 2009/0159824, published on Jun. 25, 2009 to Tibbitts et al., teaches a subsea coupler that has an internal chamber adapted for the reception of fluid under pressure, a passageway for the ingress of fluid to the chamber, a valve seat in the passageway, and a poppet. The poppet comprises a body which is engageable with the valve seat to close the passageway and a head which fits against the body and is movable away from the body. The body includes a channel for communicating fluid pressure from the internal chamber to a region between the head and the body whereby the head can be moved away from the body to relieve pressure in the chamber while the body is in engagement with the valve seat.

It is an object of the present invention to provide a collet connection system that effectively prevents damage to the hubs and damage to the gasket that is arranged between the hubs.

It is another object of the present invention to provide a poppet valve assembly for use with a collet connection system that improves installation efficiency.

It is another object of the present invention to provide a collet connection system that allows less skillful operators to carry out the connection.

It is another object of the present invention to provide a collet connection system that facilitates the ability to release the connection between the hubs.

It is another object of the present invention to provide a collet connection system that can effectively operate as a vertical connector in a subsea environment.

It is another object of the present invention to provide a poppet valve assembly for a collet connection system which facilitates the ability to connect coiled tubing to a subsea structure or to a subsea fluid line.

It is still another object of the present invention to provide a poppet valve assembly for a collet connection system which facilitates the ability to release the hubs in the event of an emergency condition.

It is still a further object of the present invention to provide a poppet valve assembly for a collet connection system which effectively seals each of the components of the connection system upon release and serves to avoid release of fluids to the subsea environment.

It is still further object of the present invention to provide a collet connection system which avoids the need for torque tools of an ROV are for the use of an ROV to establish the hub-to-hub connection.

It is still a further object of the present invention to provide a poppet valve assembly for a collet connection system which avoids any damage to the poppet valve assembly during the initial contact between the components of the collet connection system.

These and other objects and advantages of the present invention will become apparent from a reading of the attached specification and appended claims.

BRIEF SUMMARY OF THE INVENTION

The present invention is a subsea connection system for connecting to a hub. The subsea connection system comprises a body having an interior passageway, a collet having a plurality of collet segments, and outer sleeve overlying the collet, and a poppet valve assembly positioned within the interior passageway of the body. The interior passageway is adapted to allow a fluid to flow therethrough. The plurality of collet segments are movable between a locked position and an unlocked position. The plurality of collet segments are positioned adjacent to an end of the body. The outer sleeve has an inner wall and an interior. The poppet valve assembly is movable between an open position and a closed position. The open position allows a fluid flow through the interior passageway. The closed position blocks a flow of fluid through the interior passageway.

In particular, the present invention, the poppet valve assembly includes a valve seat formed or positioned in the interior passageway of the body, a plug movable between an open position and a closed position, a stem affixed to the plug and extending toward an end of the body, and a spring affixed to the plug. The plug bears on the valve seat when the plug is in the closed position. The spring urges the plug to the closed position. A tubular member extends around an end of the stem. The tubular member is slidably end resiliently mounted in the interior passageway adjacent to the end of the body. The tubular member is movable between an outward position and an inward position. The tubular member has an and extending outwardly and beyond an end of the stem when in the outward position. Another spring bears on the tubular member so as to urge the tubular member to the outward position. The stem causes the plug to move to the open position when an external force urges the tubular member to move from the outward position to the inward position.

The subsea connection system of the present invention includes a translator that is cooperative at the outer sleeve so as to move the outer sleeve between a first position and a second position. The outer sleeve has a surface bearing against the collet such that the plurality of collet segments are in the unlocked position when the outer sleeve is in the first position. The plurality of collet segments are in the locked position when the outer sleeve is in the second position. The outer sleeve has an inner wall that bears against an outer surface of the plurality of collet segments as the outer sleeve moves between the first position and the second position. The inner wall of the outer sleeve has a first tapered region that bears against the outer surface of the plurality of collet segments when the outer sleeve is in the first position and the plurality of collet segments are in the unlocked position. The inner wall of the outer sleeve has a second tapered region that bears against the outer surface of the plurality of collet segments when the outer sleeve is in the second possession and the plurality of collet segments are in the locked position.

The present invention is also a poppet assembly for use in an interior passageway of a subsea connection system. The poppet assembly includes a valve seat formed or positioned in the interior passageway of the subsea connection system, a plug movable between an open position and a closed position, a stem affixed to the plug and extending outwardly therefrom, a spring affixed to the plug so as to urge the plug to the closed position, and a tubular member extending around an end of the stem. The plug bears on the valve seat when the plug is in the closed position. The tubular channel is slidably and resiliently mounted in the interior passageway. The tubular member is movable between an outward position and an inward position. The tubular member has an end extending outwardly beyond an end of the stem when in the outward position. Another spring bears against the tubular member so as to urge the end of the tubular member to the outward position. The stem causes the plug to move to the open position when an external force urges the tubular member to move from the outward position toward the inward position.

The present invention is further a subsea connection system that comprises a first subsea flowline having an interior passageway, a second subsea flowline having an interior passageway, a first poppet assembly, and a second poppet assembly. One of the first and second subsea flowlines has a connection assembly adapted to joined to a hub of the other of the first and second subsea flowlines. Each of the first and second poppet assemblies includes a valve seat formed or positioned in the interior passageway of the subsea flowline, a plug movable between an open position and a closed position, a stem affixed to the plug and extending outwardly therefrom, a spring affixed to the plug so as to urge the plug to the closed position, and a tubular member extending around an end of the stem. The ends of the stems of the first and second poppet assemblies bear against each other when the first subsea flowline is joined to the second subsea flow line so as to move the valve seats to the open position.

The tubular members of the first and second poppet assemblies are resiliently and slidably mounted in the respective interior passageways of the first and second subsea flowlines. Each of the tubular members is movable between an outward position and an inward position. Each of the tubular members has an end extending outwardly beyond an end of the respective stems when the first and second subsea flowlines are not connected. An outward end of the tubular member of the first poppet assembly bears against an outward end of the tubular member when the second poppet assembly bears against an outward end of the tubular member of the second poppet assembly when the first subsea flowline is connected to the second subsea flowline. The tubular member of the second poppet assembly and an end of the valve stem of the second poppet assembly extend outwardly beyond an end of the hub of one of the subsea flowlines. The tubular member of the first and second poppet assemblies has a spring that urges the tubular member outwardly.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
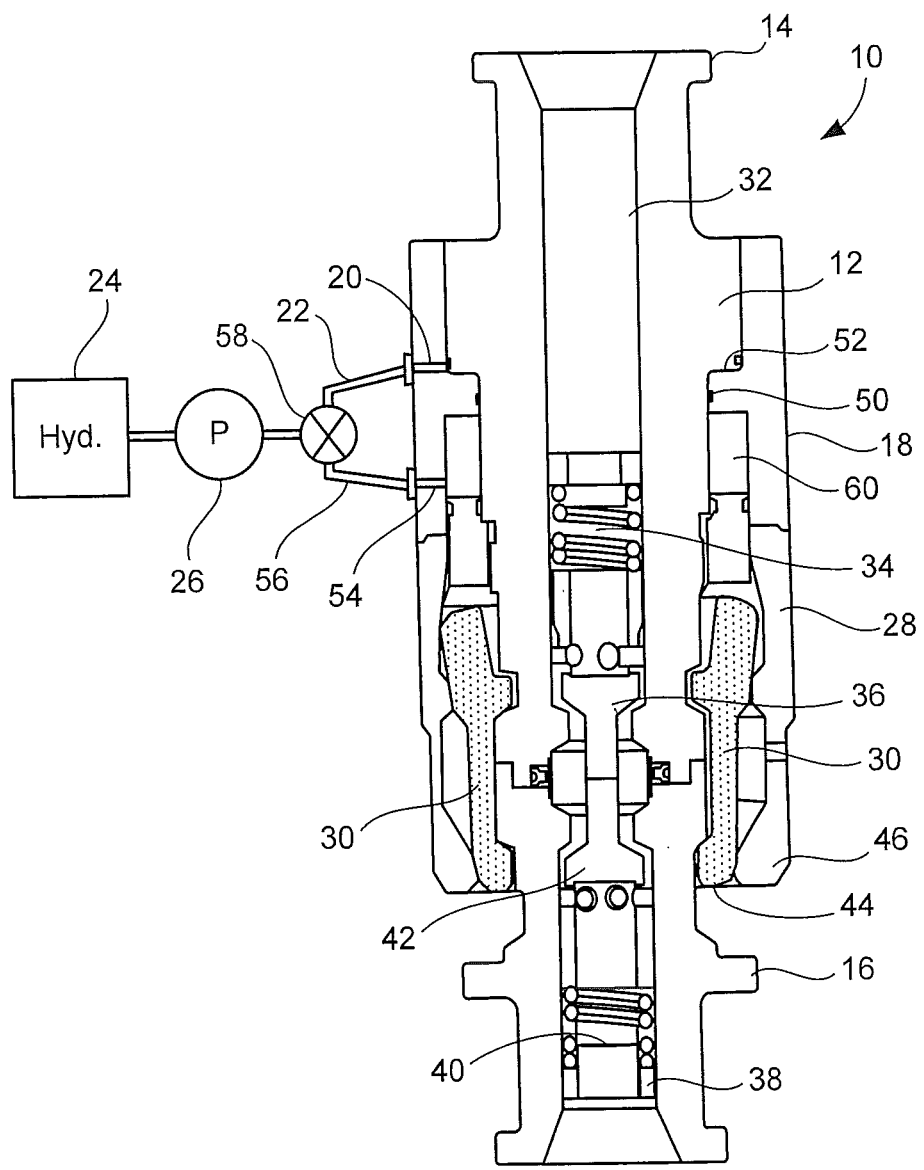
FIG. 1 is a side cross-sectional view of the subsea collet connection system of the present invention showing the connection system in a locked position.

Referring to FIG. 1, there is shown the subsea collet connection system 10 in accordance with the teachings of the preferred embodiment of the present invention. The subsea collet connection system includes a body 12 having a hub 14 at one end thereof. The hub 14 is suitable for connection to exterior piping, such as coiled tubing or to a disconnect mechanism. The subsea collet connection system 10 is used so as to connect with an outboard hub 16. The subsea collet connection system 10 has an outer sleeve 18 that is slidably and controllably positioned over the exterior of the body 12. The sleeve 18 includes a channel 20 that is formed through a wall thereof. Channel 20 can be connected to a conduit 22 that is ultimately connected to a source of hydraulic fluid 24. A pump 26 is provided so as to pass the hydraulic fluid from the source 24 through the conduit 22 and into the space between the body 12 and the inner surface of the sleeve 18. In order to allow for the sliding action of the outer sleeve 18 relative to the body 12, hydraulic fluid is introduced through conduit 22 and through the channel 20 so as to cause the outer sleeve 18 to move from the position shown in FIG. 1 to the position shown in FIGS. 3 and 4.

A lock ring 28 is in abutment with the end of the outer sleeve 18. Within the concept of the present invention, the outer sleeve 18 and the lock ring 28 can be integrally formed together. For the purposes of the present invention, the lock ring 28 is interpreted as a portion of the outer sleeve 18. When the sleeve 18 moves in relation to the body 12, the lock ring 28 will also move. There are a plurality of collet segments 30 that are positioned within the interior of the lock ring 28. Each of the collet segments 30 has an outer surface with a particular shape which can cause the actions of locking and releasing created by the subsea collet connection system 10 in accordance with the present invention. The lock ring 30 has an interior shape which bears against the outer surface of the collet segments 30 so as to facilitate the movement of the collet segments 30 between the locked position and unlocked position. FIG. 1 illustrates the plurality of collet segments 30 has being in the locked position. In this locked position, the hub 16 is engaged with the end of the body 12.

The connector body 12 includes in interior bore 32. A spring 34 is resiliently mounted in the interior bore 32 of the body 12. A poppet 36 is located within the interior bore 32 of the body 12 and has a surface which can bear against an inner wall of the body 12. The hub 16 has an interior passageway 38 that has a spring 40 mounted therein. Spring 40 is configured so as to bear against the poppet 42. Poppet 42 has a surface that is designed to seal in relation to a shoulder formed on the wall of the interior passageway 38 of the hub 16.

Figure 5:
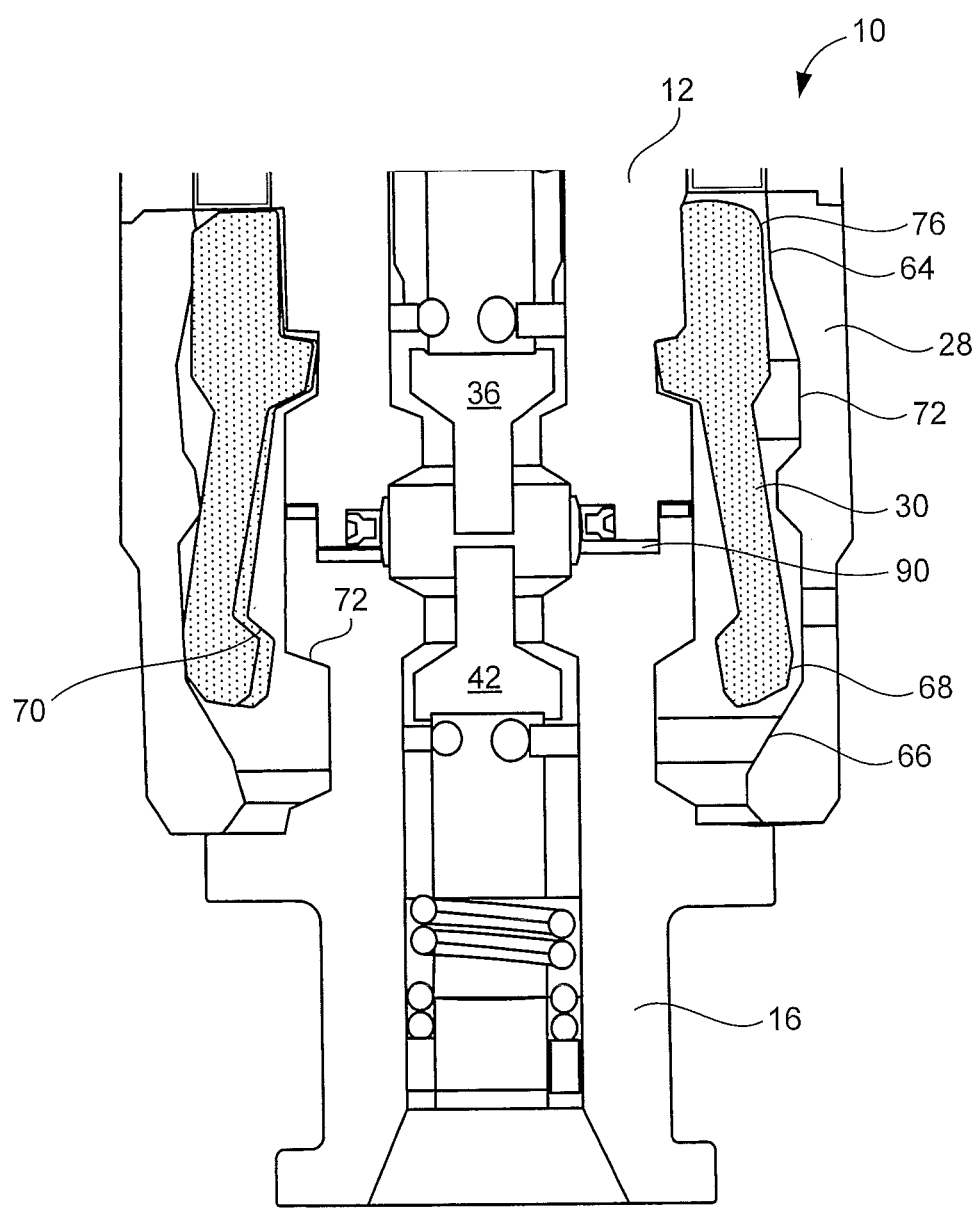
FIG. 5 is a detailed view showing the relationship between the collet segments, the sleeve and the hub when in the released position.

FIG. 5 shows the subsea collet connection system 10 in the locked position. As can be seen, the end 44 of the collet segments 30 has an interior shoulder that bears against an exterior shoulder at the end of the hub 16. This locked configuration is accomplished by the bearing end 46 of the lock ring 28 strongly urging against the exterior of the end portion of the collet segments 30. The sleeve 18 will be in its uppermost position such that a flange 50 extending inwardly of the sleeve 18 will bear against a shoulder 52 formed on the body 12. In this position, the end of the poppet 36 is illustrated as bearing against the end of the poppet 42. This will resiliently urge the shoulders of the poppets 36 and 42 away from their seated position. As result, fluid is able to flow through the interior bore 32 of the body 12 enter the interior passageway 38 of the hub 16, or vice versa.

In FIG. 1, it can be seen that there is another conduit 54 that extends through the wall of the sleeve 18. Another channel 54 is formed through the wall of the sleeve 18 so as to open to the interior of the sleeve 18 and to the exterior of the body 12. A conduit 56 is connected the channel 54 and is ultimately connected to the pump 26 and the hydraulic fluid supply 24. So as to allow for the movement of the sleeve 18 between a first position and a second position, a valve 58 is cooperative with the pump 26 and the hydraulic fluid supply 24. Valve 58 can be suitably adapted so as to be actuated so as to deliver hydraulic fluid, under pressure, from the hydraulic fluid supply 24 through the conduit 22 and into the channel 20. Alternatively, the valve 58 can be adapted so as to cause the hydraulic fluid from the hydraulic fluid supply 24 to pass under pressure through the conduit 56 and into the channel 54. This allows the sleeve to move between the second position (locking the collet segments 30 upon the hub 16) and the first position in which the collet segments 30 are unlocked from the hub 16 so as to allow the hub 16 to be properly released.

FIG. 1 illustrates the sleeve 18 in its second position which locks the collet segments 30. As such, fluid is introduced under pressure through the channel 54 so as to fill and annular space 60 on a side of the flange 50 from the shoulder 52. Flange 50 and the sleeve 18 will move toward the shoulder 52 of the body 12. As a result, the bearing end 46 of the sleeve 18 will strongly bear against the exterior of the collet segments 30 so as to lock the collet segments 30 upon the shoulder of the hub 16. As a result, fluid communication is established between the interior bore 32 of the body 12 and the interior passageway 38 of the hub 16. Since the ends of the poppets 36 and 42 bear against each other, they are properly offset from their seated position so as to allow fluid flow therethrough. As used herein, the hydraulic fluid supply 24, in combination with the pump 26, along with channels 20 and 54, serves as the "translator" of the present invention. Within the concept of the present invention, various other techniques for causing the translatable movement of the sleeve 18 relative to the body 12 can also be established. In particular, suitable actuating mechanisms can also create such a movement. Additionally, an ROV torque tool can also be used, along with suitable actuating mechanisms, so as to cause this movement. The "translator" as shown in FIG. 1 is simply one form of creating the requisite movement of the sleeve 18 with respect to the body 12.

Figure 2:
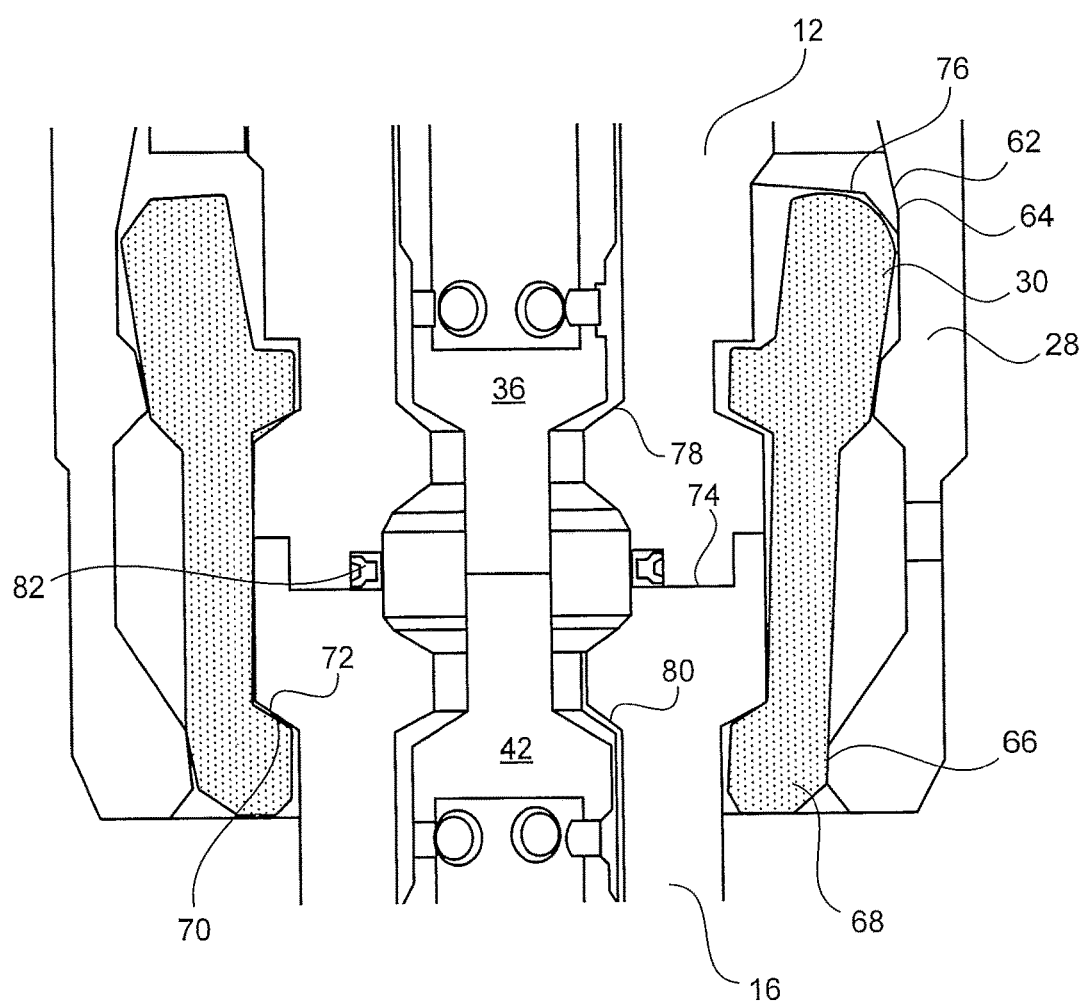
FIG. 2 is a cross-section detailed view showing the relationship between the collet segments, the sleeve and the hub of the subsea collet connection system of the present invention.

FIG. 2 shows the particular relationship between the collet segment 30, the lock ring 28 of the sleeve 18, the end of the body 12 and the end of the hub 16. In particular, it can be seen that the lock ring 28 of sleeve 18 has an inner surface that bears against the outer surface of the collet segments 30 as the sleeve 18 moves between the first position and the second position. The inner wall 62 of the lock ring 28 includes a first tapered region 64 and a second tapered region 66. The second tapered region 66 bears against the outer surface at the end 68 of the collet segment 30 when the outer sleeve 18 is in the second position and the plurality of collet segments 30 are in the locked position. The end 68 of the plurality of collet segments includes an inner shoulder 70 that is suitably tapered. Similarly, the hub 16 includes a tapered shoulder 72 adjacent an end thereof. As the second tapered region 66 on the inner surface 62 of the lock ring 28 bears against the end 68 of the plurality of collet segments 30, the inner shoulder 70 will slide along the tapered surface 72 of the hub 16 so as to draw the end of the hub 16 into tight engagement against the end 74 of the body 12. The first tapered region 64 on the inner surface 62 of the lock ring 28 is released from contact with the end 76 of the collet segments 30. As a result, the collet segments 30 are able to pivot relative to the body 12.

In the position shown in FIG. 2, it can be seen that the first poppet 36 has an end that is in abutment with the second poppet 42. As a result, the shoulder of the first poppet 36 is spaced from the inner wall of the shoulder 78 of body 12 so as to cause a flow path therein. The force of abutment between the first poppet 36 and the second poppet 42 will overcome the resistance created by the spring 34. Similarly, the second poppet 42 is spaced from the shoulder 80 in the interior passageway 38 of the hub 16 so as to allow a flow path therein. The force of abutment overcomes the resistance caused by the spring 40 in the interior passageway 38 of the hub 16. In the configuration shown in FIG. 2, the end of the hub 16 is in tight abutment with the end 74 of the body 12 so as to be in a tight sealing relationship therewith. A seal 82 can be positioned at the end 74 of the body 12 so as to further facilitate the tight sealing relationship between the end of the hub 16 and the end of the body 12. Since the poppets 36 and 42 are separated from their seated position, a fluid flow connection is established between the hub 16 and the interior bore 32 of the body 12.

Figure 3:
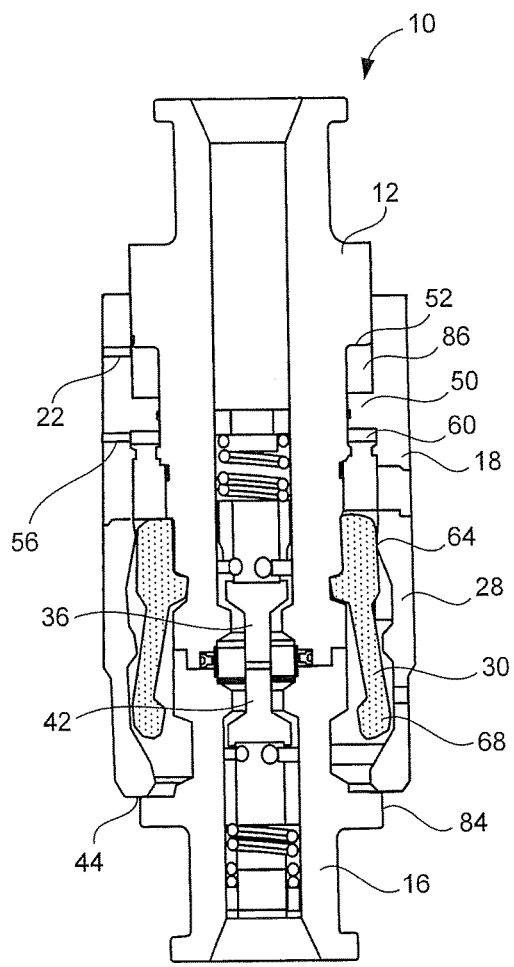
FIG. 3 is a cross-sectional view of the subsea collet connection system of the present invention in an unlocked position.

FIG. 3 shows the subsea collet connection system 10 of the present invention in its unlocked position. As can be seen, hydraulic fluid has been introduced into the channel 22 so as to urge the flange 50 away from the shoulder 52 of the body 12. This causes the sleeve 18 to move downwardly so as to also cause the lock ring 28 to move downwardly. As result, the inner surface of the lock ring 28 will bear against the first tapered region 64 of the collet segments 30 such that the end portion 68 of the collet segments 30 releases from the shoulder 72 at the end of the hub 16. As a result, the collet segments 30 will no longer grasp the hub 16. As will be described hereinafter, the first tapered region 64 on the inner surface of the lock ring 28 has a particular shape that bears against the outer surface of the collet 30 so as to pivot the collet segment 30 outwardly.

In this unlock unlocked position, as shown in FIG. 3, the first poppet 36 will bear against the second poppet 42. In this configuration, the end of the hub 16 still bears against the end of the body 12. The hub 16 has not yet been released from the body 12. Also, the flange 84 of the hub 16 will still bear against the end 44 of body 12.

The "translator" of the present invention allows the hydraulic fluids to be introduced under pressure into the space 86 between the flange 50 of the outer sleeve 18 and the shoulder 52 of the body 12. The fluid in the annular receiving space 60 will exit from that space through the channel 56. The piston that results from the relationship between the flange 50 and the body 12 will allow the sleeve 18, along with the lock ring 28, to move between a second position (as shown in FIGS. 1 and 2) to a first position in which the collet segments 30 are effectively released from engagement with the hub 16. This allows the hub 16 to be released from the body 12.

Figure 4:
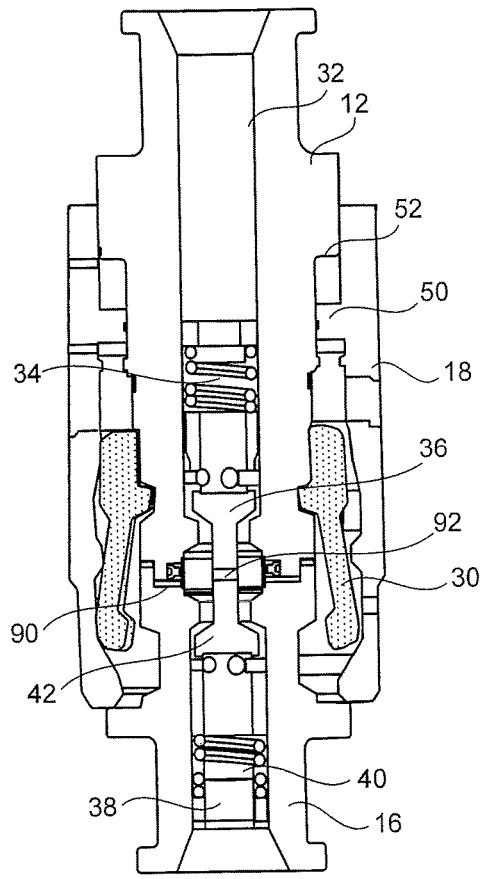
FIG. 4 is a cross-sectional view of the subsea collet connection system of the present invention in a released position.

In FIG. 4, it can be seen that the flange 50 of the sleeve 18 has moved further away from the shoulder 52 of the body 12. This causes the collet segments 30 to further urge the hub 16 away from the end of the body 16. There is a separation space 90 that occurs between the end of the body 12 and the end of the hub 16. This is the release position. Also, as can be seen, there is a small space 92 formed between the ends of the collets 36 and 42. Since there is a space 92, the spring 34 will urge the poppet 36 into strong abutment with the inner wall of the interior bore 32 of the body 12. As a result, the interior of the body 12 is sealed by the poppet 36. Similarly, the spring 40 in the hub 16 will urge the second poppet 42 against the shoulder on the inner wall of the interior passageway 38 of the hub 16. As a result, the interiors of the body 12 and the hub 16 are sealed. When the subsea collet connection system 10 of the present invention is released from the hub 16, the poppets 36 and 42 will prevent spillage or leakage of fluid into the subsea environment.

FIG. 5 specifically shows this releasing action. Importantly, the first tapered region 64 on the inner wall of the lock ring 28 will bear against the end 76 of the collet segment 30. As a result, the end 76 of the collet segment 30 is forced against the outer surface of the body 12. This causes the collet segment 30 to pivot outwardly such that the inner shoulder 70 is released from the shoulder 72 of the hub 16. In FIG. 5, the collet segments 30 of the subsea collet connection system 10 are in their release position. As a result, there will be a space 90 that results between the end of the body 12 and the end of the hub 16. The first poppet 36 and the second poppet 42 are illustrated in a position sealing against the respective shoulders of the body 12 and the hub 16. The second tapered region 66 of the lock ring 28 is illustrated in its lowermost position. This shows clear separation between the second tapered region 66 and the end surface 68 of the collet segment 30. This particular configuration of the inner surface 72 of the lock ring 28 is unique in that the structural pattern of tapered surfaces formed on the inner surface 72 achieves both the locking of the collet segments 30 upon the hub 16 and also achieves the release of the collet segments 30 from the hub 16 merely by the sliding motion of the sleeve 18 and/or the lock ring 28. During this motion, the poppets 36 and 42 are particularly configured so as to effectively create a sealed condition whenever the collet segments 30 are in this position whereby they are released from the hub 16.

Figure 6:
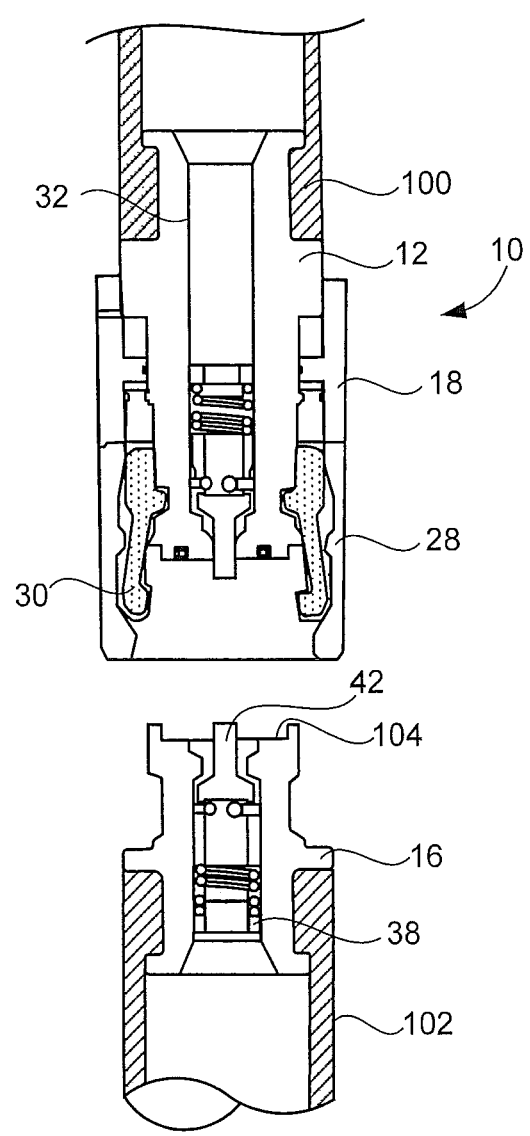
FIG. 6 is a cross-sectional view showing the hub as released from the connector of the subsea collet connection system of the present invention.

FIG. 6 shows the subsea collet connection system 10 as released from the hub 16. In FIG. 6, there is a coiled tubing 100 that is affixed to the end of the body 12. As a result, the coiled tubing 100 can establish fluid communication with the interior bore 32 of the body 12. As a result, chemicals or fluids can be delivered from a surface location into the bore 32 or transmitted from a subsea location through the bore 32 and into the coiled tubing 100.

FIG. 6 illustrates the hub 16 as having a hose 102 connected thereto. The hub 16 will have an end 104 that extends outwardly beyond the hose 102. The interior passageway 38 of the hub 16 can be used so as to allow fluids to pass from the interior bore 32 the body 12, through the hub 16 and into the hose 102. Alternatively, fluids can pass from the hose 102 up through the interior passageway 38 of the hub 16, through the interior bore 32 of the body 12 and into the coiled tubing 100.

The sleeve 18 and the lock ring 28 are illustrated in the first or release position. As a result, the collet segments 30 have been released from the hub 16. In this configuration, the poppet 36 is sealed against the inner wall of the interior bore 32 of body 12. The poppet 42 is sealed against the inner wall of the interior passageway 38 of the hub 16. The weight associated with the hub 16, along with the hose 102, causes the hub 16 to separate, by action of gravity, from the interior of the lock ring 28. The poppet 36 is in sealed relationship with the interior bore of the body 12 so as to prevent any liquid within the body 12 or within the coiled tubing 100 from being released into the marine environment. Similarly, it can be seen that the poppet 42 is in sealed relationship with the inner wall of the interior passageway of the hub 16. Once again, the serves to prevent any release of contaminants or fluids from the interior of the hose 102 or from the interior of the hub 16 into the marine environment.

In order to install the hub 16 into the subsea collet connection system 10, it is only necessary to reverse the steps illustrated in FIGS. 1-5 herein. In this manner, the subsea collet connection system 10 can easily engage with the hub 16 in order to create the requisite sealed fluid-tight relationship therebetween.

Figure 7:
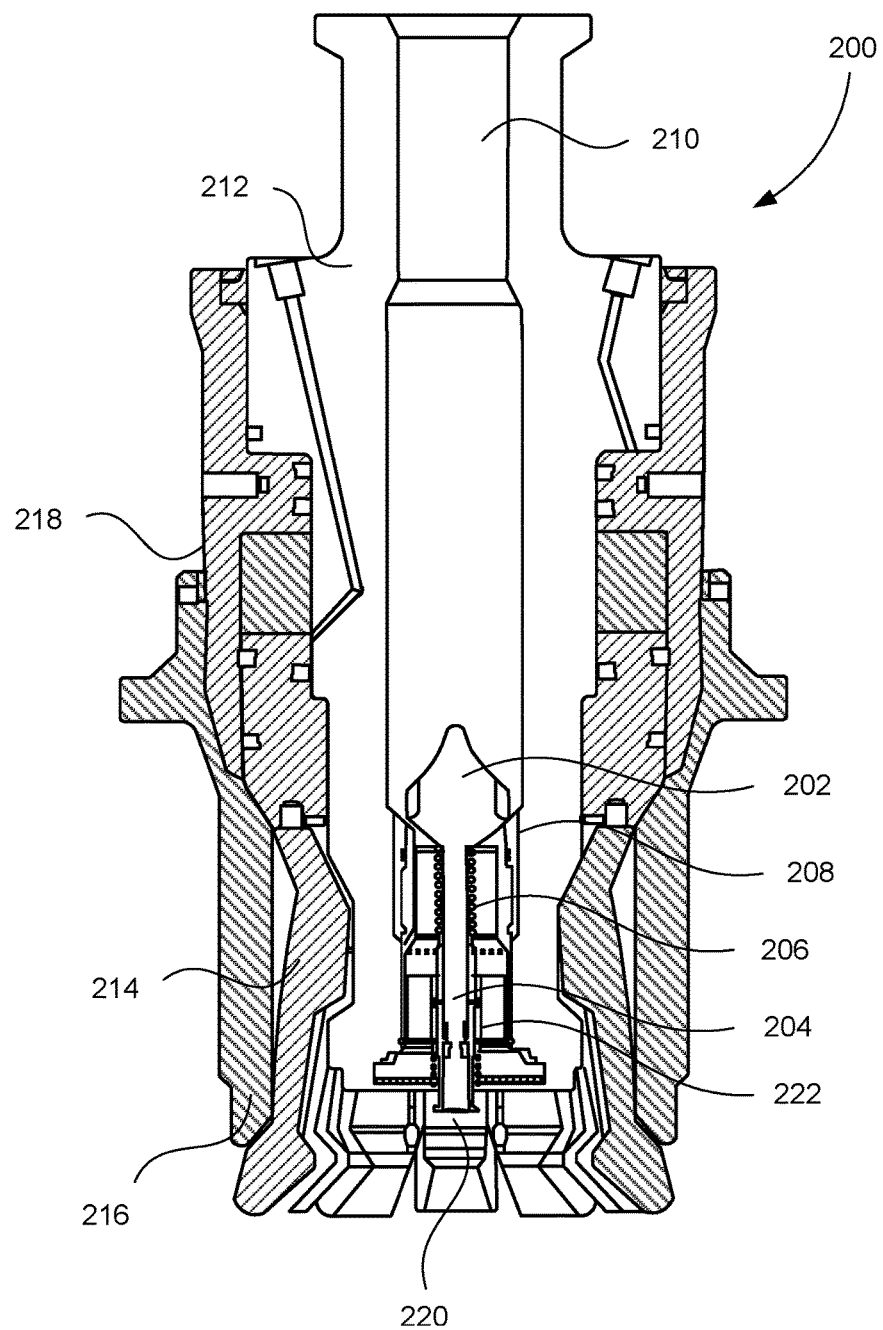
FIG. 7 is a cross-sectional view of the of the inboard hub of the collet connection system showing the poppet valve assembly in a closed position prior to make-up.

Referring to FIG. 7, there shown the poppet valve assembly 200 as used in association with the collet connection system of the present invention. The poppet valve assembly 200 includes a plug 202 having a valve stem 204. A spring 206 is positioned around the valve stem 204 so as to bear against an end of the plug 202. The spring 206 urges the plug 202 into a position against the valve seat 208. In this position, the poppet valve assembly 200 has closed the bore 210 of the inboard hub 212.

In the configuration shown in FIG. 7, the inboard hub 212 includes the collet segments 214 which are illustrated as it as extending beyond the distal end of the lock ring 216. As stated hereinbefore, the outer sleeve 218 is properly actuated so as to move the lock ring 216 and the collet segments 214 to the position shown in FIG. 6. It can be seen that the valve stem 204 has an end opposite the plug 202 which is inward of the end 220 of the tube of the tubular channel 222.

Since the end of the valve stem 214 is recessed inwardly of the end 220 of the tubular channel 222, there is no exposure of the end of the valve stem 204 in the position shown in FIG. 7. Since no contact in this position would cause the plug 202 to unseat from the valve seat 208, the plug 202 will effectively and continually block the flow of fluids through the bore 210.

Figure 8:
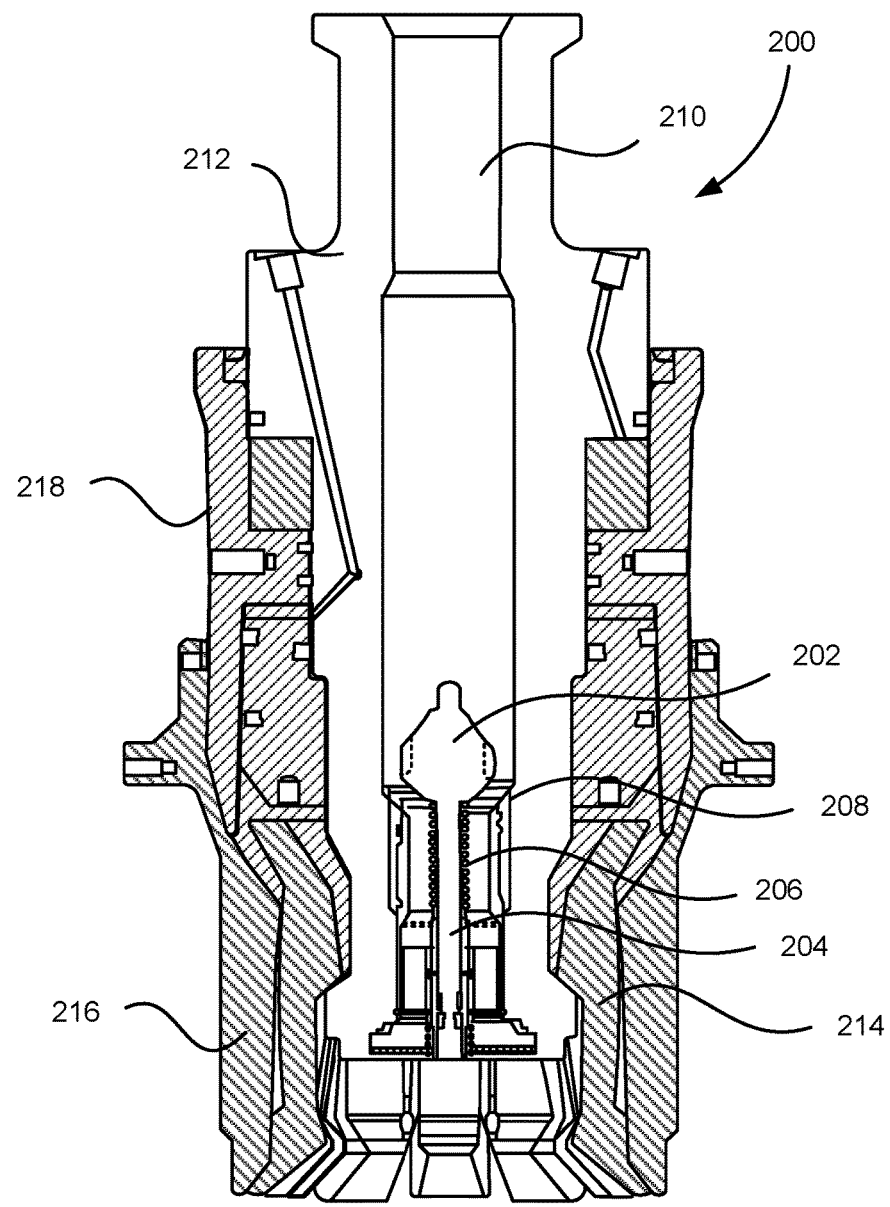
FIG. 8 is a cross-sectional view of the inboard of the collet connection system of the present invention showing the poppet valve assembly in its open position following make-up.

FIG. 8 illustrates the inboard hub 212 with the collet segments 214 in the in the closed or engaged position. As stated hereinbefore, hydraulic pressure is utilized so as to move the outer sleeve 218 and the lock ring 216 so as to bear against the outer surface of the collet segments 214. In this position, the component that is joined by the collet segments 214 in the closed position will cause the valve stem 204 of the poppet valve assembly 202 move inwardly so as to cause the plug 202 to unseat from the valve seat 208. In other words, pressure applied to the end of the valve stem 204 opposite the plug 202 will overcome the resistance provided by spring 206 so as to cause the plug 202 to unseat. As such, this will allow fluid flow through the bore 210.

Figure 9:
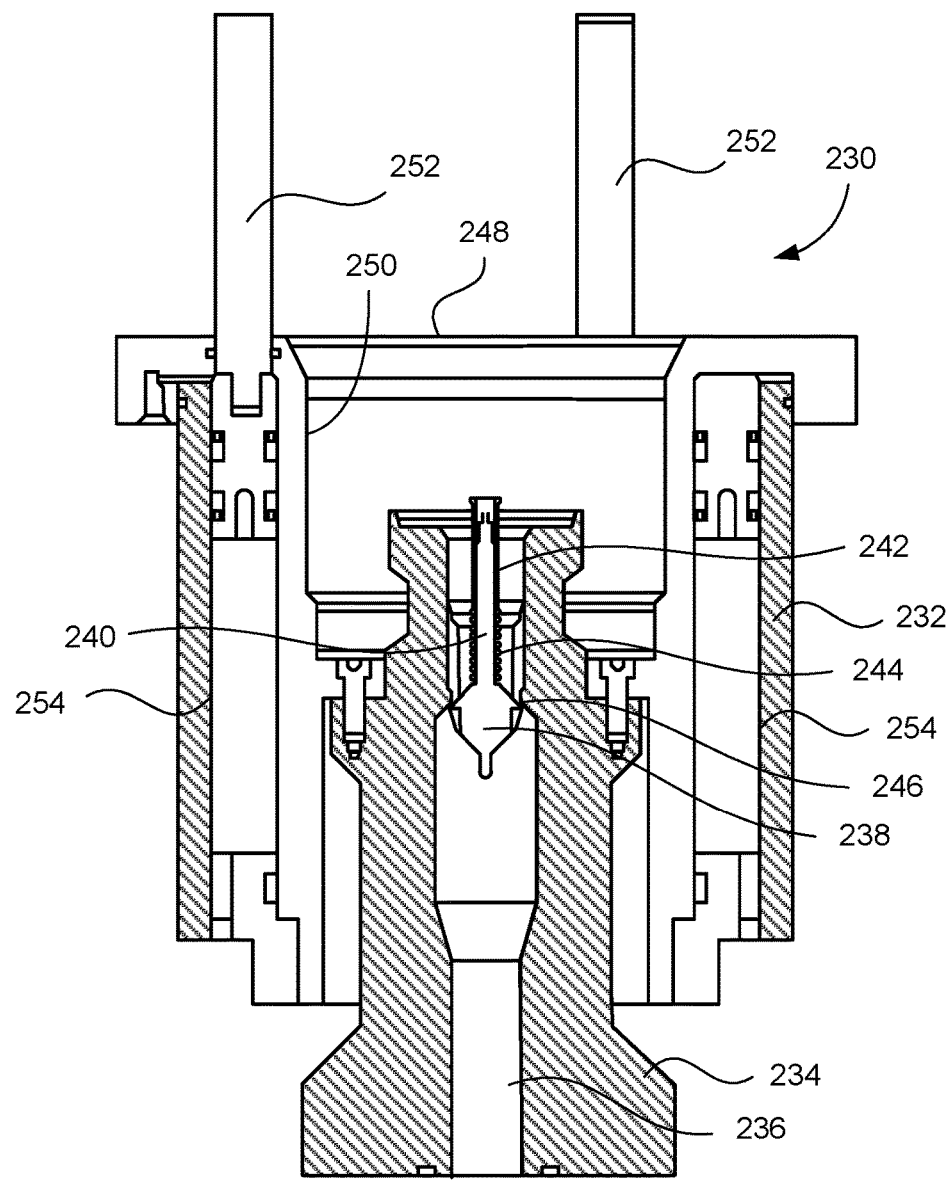
FIG. 9 is a cross-sectional view of the collet connection system to the present invention showing the poppet valve assembly therein in a closed position prior to make-up or subsequent to disconnection.

FIG. 9 shows the poppet valve assembly 230 as used in association with the outboard hub 232. In particular, in FIG. 9, the outboard hub 232 is not connected to the inboard hub or to any other structure. The outboard hub 232 has a body 234 with a bore 236 extending therethrough. The poppet valve assembly 230 is mounted within this bore 232.

As with the previous poppet valve assembly 200, as described in FIGS. 7 and 8 hereinbefore, the poppet valve assembly of the present invention includes a plug 238 having a valve stem 240 that extends through a tubular member 242 in the body 234 and adjacent to the end of the body. A spring 244 will extend around the valve stem 240 so as to urge the plug 238 against its valve seat 246. Since the plug 238 is closed against the valve seat 246, no fluids can flow outwardly of the bore 238 in a direction toward the end 248 of the outboard hub 232. The tubular member 242 as also slidable and resiliently mounted, as will be described hereinafter.

The outboard hub 232 is provided with a funnel-type can 250 that can serve to receive the end of the inboard hub therein. Guides 252 can aligned with respective channels 254 in the body 234 of the outboard hub 232 so as to allow for a guided movement between the components.

As can be seen in FIG. 9, the end of the valve stem 240 opposite the plug 238 is recessed within the end of the tubular member 242. As a result, no matter how how much force is applied during the connection of the inboard hub 212 to the outboard hub 232, the recessing of the end of the valve stem 240 will prevent any accidental opening of the plug 238 from the valve seat 246 so as to allow fluid flow through the bore 236. Also, since the spring 244 urges the plug 238 in its sealed or closed position, there is no possibility of release of fluids upon the disconnection of the outboard hub 232 from the inboard hub 212.

Figure 10:
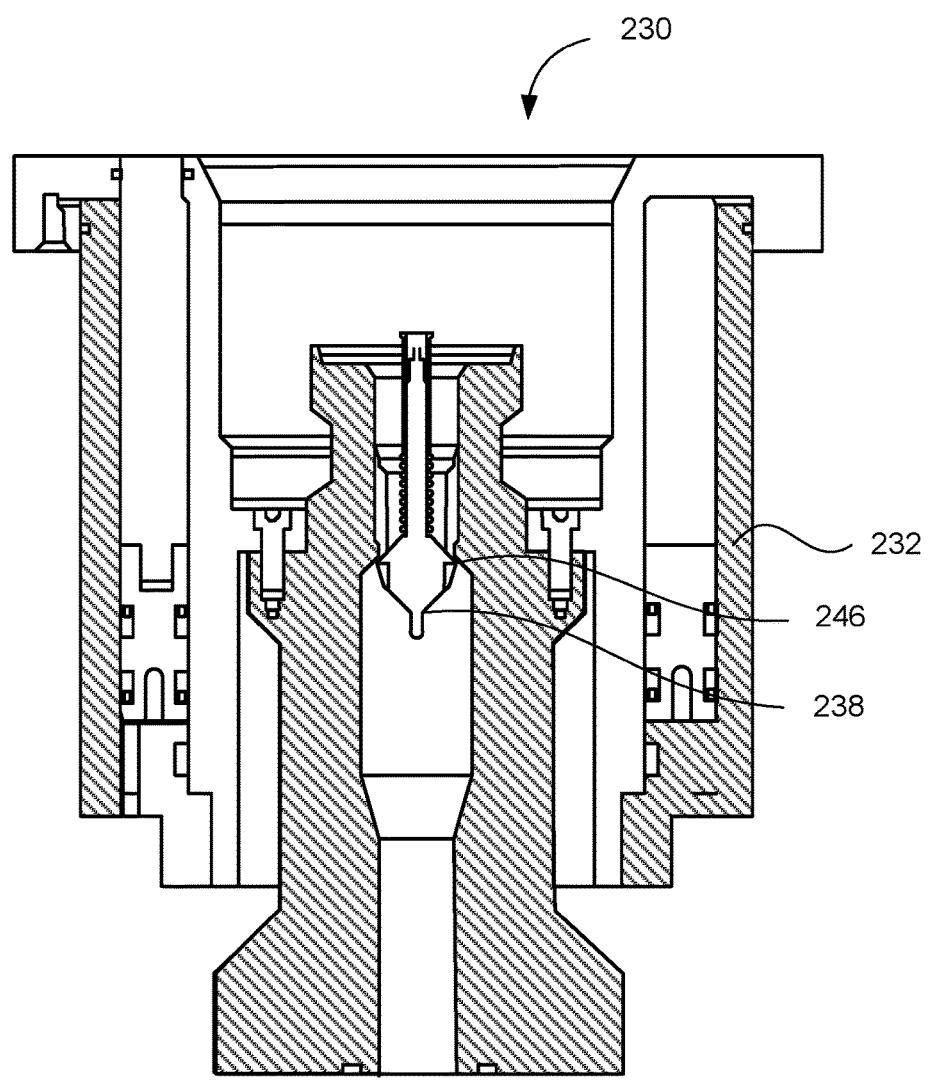
FIG. 10 shows the outboard hub of the collet connection system of the present invention showing the poppet valve assembly in an open position following make-up.

FIG. 10 shows the poppet valve assembly 230 in its open position. As can be seen, the plug 238 has moved away from the valve seat 246 so as to allow fluid flow therethrough. In order to cause the unseating of the plug 238 from the valve seat 246. The plug 238 will unseat from the valve seat 246 when the outboard hub 232 is engaged with the inboard hub 212.

Figure 11:
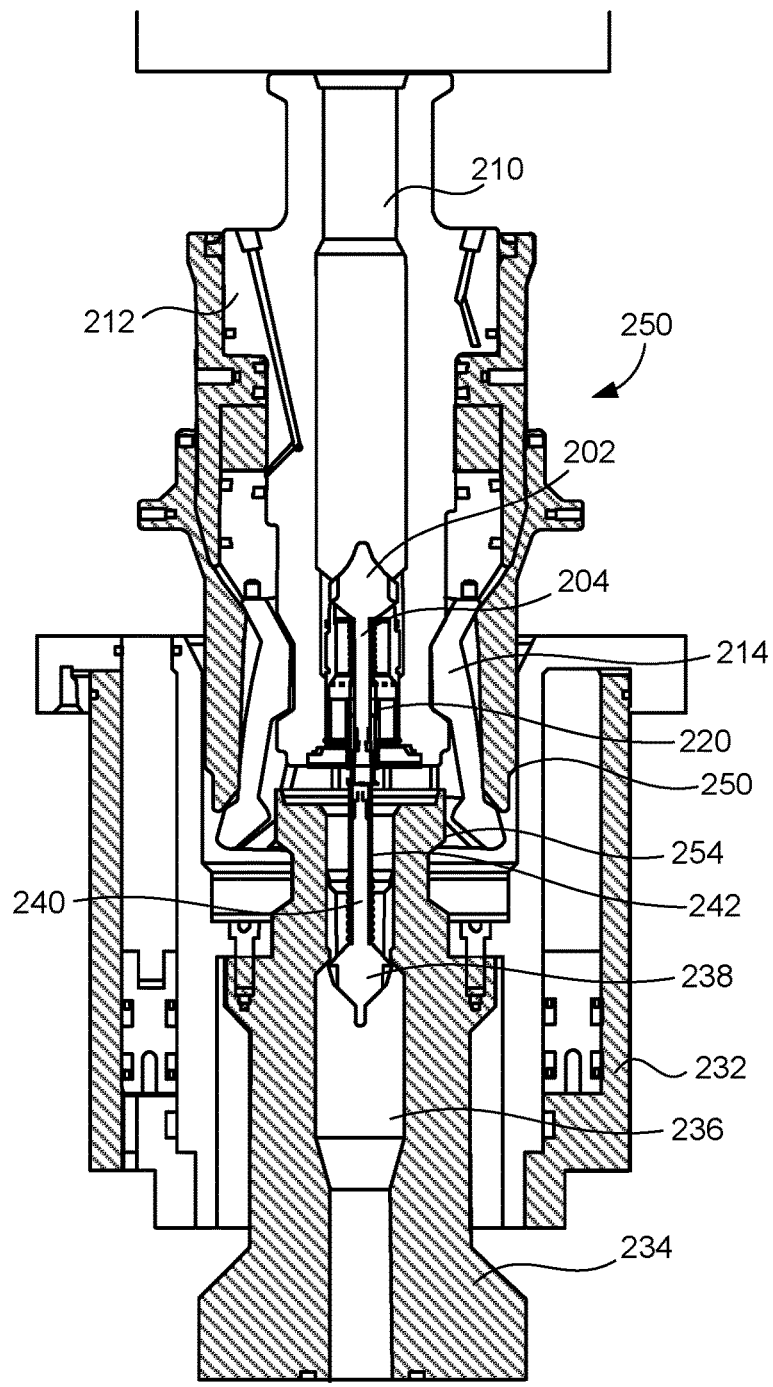
FIG. 11 is a cross-sectional view of the collet connection of system of the present invention showing the poppet valve assemblies of the inboard and outboard hubs upon initial contact during make-up.

FIG. 11 illustrates the initial make-up of the collet connection system 250 of the present invention. In particular, it can be seen that the inboard hub 212 is initially inserted into the funnel-type can 250 of the outboard hub 232. The collet segments 214 are illustrated as being in a position generally surrounding the end of the body 234 of the outboard hub 232. In this position, the ends of the tubular members 220 and 242 will be close to one another or may even contact. Since these tubular channels can be spring-loaded, the end of the valve stem 204 will move into proximity with the valve stem 240. Ultimately, as the inboard hub 212 moves further toward the outboard hub 232, the respective ends of the valve stems 204 and 240 will eventually contact each other. Ultimately, when the ends of the collet segments 214 engage with the shoulder 254, then the locking engagement between the inboard hub 212 in the outboard hub 232 will cause the ends of the valve stems 204 and 242 urge against each other so as to overcome the resistance force urged by the respective springs 206 and 244 so as to cause the plug 202 to unseat from the valve seat associated with bore 210 and cause the plug 238 to unseat from the valve seat of bore 236. As a result, fluid flow will be achieved between the respective bores 210 and 236.

FIGS. 12A-12D are detailed illustrations of the specific poppet valve 300 of the present invention. In particular, with reference to FIG. 12A the poppet valve assembly 300 has a plug 302 with a protrusion 304 extending outwardly therefrom. The plug 302 has a valve stem 306 extending therefrom. The valve stem 306 will extend through the interior of the bore 308 and also through the interior of the tubular member 310. The end 312 is illustrated as recessed within the end 314 of the tubular member 310. The tubular member 310 is slidably mounted within the bore 306. In this position, the plug 304 will be sealed against the valve seat 316.

Figure 12A:
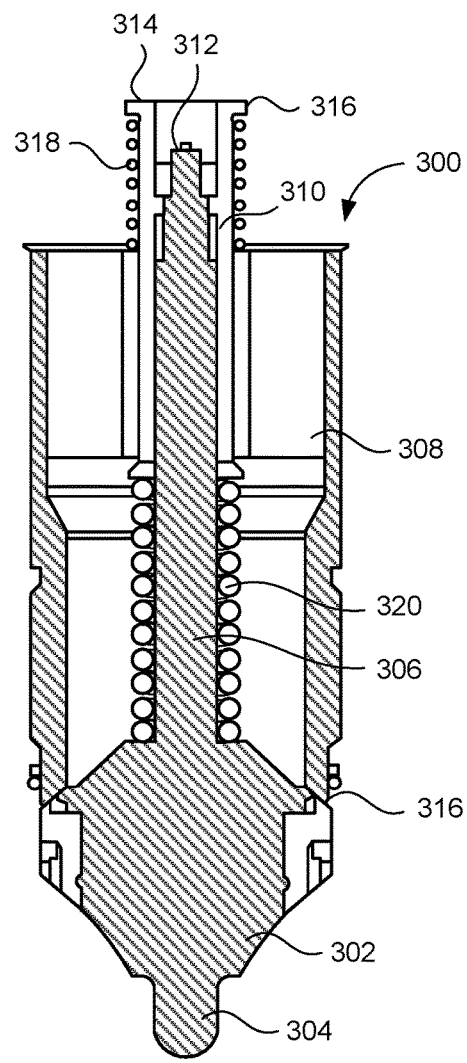
FIGS. 12A-12D show the poppet valve assembly of the present invention as movable between a variety of positions during make-up and disengagement of the collet connection system.

In FIG. 12A, it can be seen that the tubular member 310 includes a flange 316 at an end thereof opposite the plug 302. A spring 318 extends over the exterior of the tubular member 310 and will bear against the flange 316. As such, spring 318 will urge the tubular member 310 in an outwardmost position. Spring 320 bears against the plug 302 so as to urge the plug 302 into its closed position against the valve seat 316.

Figure 12B:
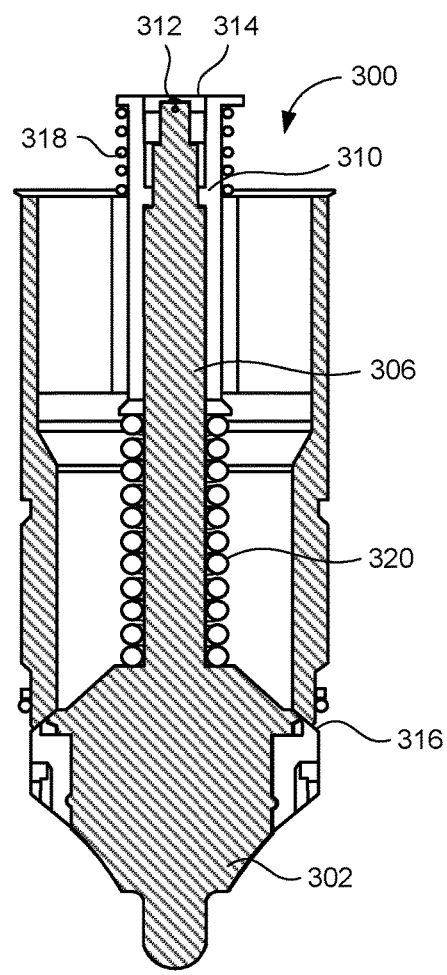

FIG. 12B illustrates the configuration of the poppet valve 300 when there is an initial make-up and the poppet valve is engaged by the weight of the other component. As can be seen, the weight would urge against the end 314 of the tubular member 310 so as to overcome slightly the resistance of spring 318. This will move the end 314 of the tubular member 310 in a direction toward the plug 302. As a result, the end 312 of the valve stem 306 will be at the end 314 of the tubular member 310. Since the end 312 is not fully exposed beyond the end 314 of the tubular member 310, the spring 320 will continue to urge the plug 302 against the valve seat 316. As such, the spring 318 serves to effectively resist the forces that are applied to the valve end 312 of the valve stem 306 or to the end 314 of the tubular member 300 during the initial make-up. It is only when the strong clamping action provided by the collet segments upon the internal shoulder are achieved that the spring forces created by the spring 318 are sufficiently overcome so as to establish connection between the ends of the valve stems of the separate poppet valve assemblies so as to cause the opening of the plug 302.

Figure 12C:
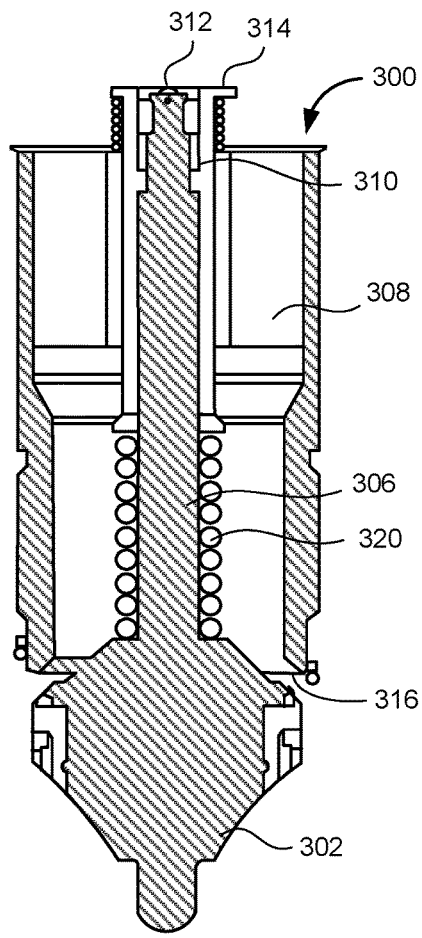

FIG. 12C shows the configuration of the present invention where the connector is engaged and locked by the collet segments of the collet. In this configuration, the end 314 of the tubular member 310 is fully compressed so as to expose the end 312 of the valve stem 306. As such, the respective ends of the valve stems of the poppet valve assemblies associated with the inboard hub and the outboard hub will contact each other. This force overcomes the resistance of spring 320 so as to cause the plug 302 to move away from the valve seat 316. As such, fluid flow through the bore 308 is achieved.

Figure 12D:
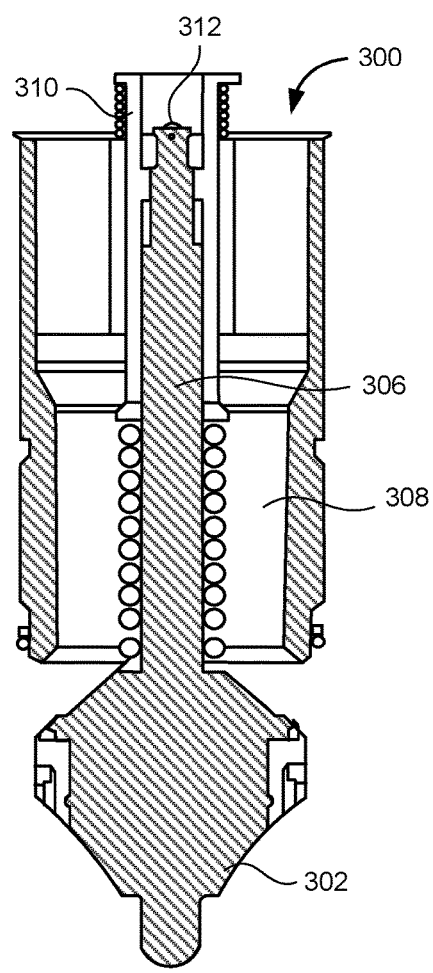

FIG. 12D illustrates the poppet valve 300 where the connector is engaged and locked by the collets. The spring opens the plug 302 fully and holds it open during fluid flow through the bore 308. As can be seen, the end 312 of the valve stem 306 is fully urged inwardly of the compressed tubular member 310 by the action of the fluid pressure through the bore 308. As such, the position shown in FIG. 12B is the position that is achieved when pressure equalizing is between the inboard hub and the outboard hub.

When the connection between the inboard hub and the outboard hub is disengaged, the configuration of the poppet valve 300 will return to that shown in FIG. 12A.

The present invention incorporates a poppet valve assembly into a collet connector for a shutoff of either conduit or bore of the various components upon disconnect. The poppet valve has a spring that allows the connector to make up under weight without forcing the poppet open. The poppet is forced partially opened when the collets engaged so as to allow pressure to equalize across the poppet. Once pressure is equal, the spring forces the poppet fully open and holds the poppet open while flowing. Without the weight set travel allowed by the spring, the connector would not reach the collet engagement point. Large external forces would be required.

The foregoing disclosure and description of the invention is illustrative and explanatory thereof. Various changes in the details associated with the present invention can be made within the scope of the present claims without departing from the true spirit of the invention. The present invention should only be limited by the following claims and their legal equivalents.

We claim:

1. A subsea connection system for connecting to a hub, the subsea connection system comprising:
    a body having an interior passageway, said interior passageway adapted to allow a fluid to flow therethrough;
    a collet having a plurality of collet segments, said plurality of collet segments movable between a locked position and an unlocked position, said plurality of collet segments positioned adjacent to an end of said body; and
    an outer sleeve overlying said collet, said outer sleeve having an inner wall and an interior; and
    a poppet valve assembly positioned within said interior passageway of said body, said poppet valve assembly movable between an open position and a closed position, said open position allowing a fluid flow through said interior passageway, said closed position blocking a flow of fluid through said interior passageway, said poppet valve assembly comprising:
        a valve seat formed or positioned in said interior passageway of said body;
        a plug movable between an open position and a closed position, said plug bearing on said valve seat when said plug is in said closed position;
        a stem affixed to said plug and extending toward said end of said body; and
        a spring affixed to said plug, said spring urging said plug to said closed position;
        a tubular member extending around an end of said stem, said tubular member being slidably and resiliently mounted in said interior passageway adjacent said end of said body, said tubular member movable between an outward position and an inward position, said tubular member having an end extending outwardly and beyond an end of said stem when in the outward position.

2. The subsea connection system of claim 1, further comprising:
    another spring bearing against said tubular member so as to urge said end of said tubular member to the outward position.

3. The subsea connection system of claim 1, said stem causing said plug to move to the open position when an external force urges said tubular member to move from the outward position toward the inward position.

4. A poppet assembly for use in an interior passageway of a subsea connection system, the poppet assembly comprising:
    a valve seat formed or positioned in the interior passageway;
    a plug movable between an open position and a closed position, said plug bearing on said valve seat when said plug is in said closed position;
    a stem affixed to said plug and extending outwardly therefrom; and
    a spring affixed to said plug, said spring urging said plug to said closed position; and
    a tubular member extending around an end of said stem, said tubular member being slidably and resiliently mounted in the interior passageway, said tubular member movable between an outward position and an inward position, said tubular member having an end extending outwardly and beyond an end of said stem when in the outward position.

5. The poppet assembly of claim 4, further comprising:
    another spring bearing against said tubular member so as to urge said end of said tubular member to the outward position.

6. The poppet assembly of claim 4, said stem causing said plug to move to the open position when an external force urges said tubular member to move from an outward position toward an inward position.

7. A subsea connection system comprising:
    a first subsea flowline having an interior passageway;
    a second subsea flowline having an interior passageway, one of said first and second subsea flowlines having a connection assembly adapted to joined to a hub of another of said first and second subsea flowlines;
    a first poppet assembly comprising:
        a valve seat formed or positioned in said interior passageway of said first subsea flowline;
        a plug movable between an open position and a closed position, said plug bearing on said valve seat when said plug is in said closed position;
        a stem affixed to said plug and extending outwardly therefrom;
        a spring affixed to said plug, said spring urging said plug to the closed position; and
        a tubular member extending around an end of said stem; and
    a second poppet assembly comprising:
        another valve seat formed or positioned in said interior passageway of said second subsea flowline;
        another plug movable between an open position and a closed position, said another plug bearing on said another valve seat when said another plug is in the closed position;
        another stem affixed to said another plug and extending outwardly therefrom; and
        another spring affixed to said another plug, said another spring urging said another plug to the closed position, the ends of the stems of said first and second poppet assemblies bearing against each other when said first subsea flowline is joined to said second subsea flowline so as to move the valve seats to the open position; and another tubular member extending around an end of said another stem.

8. The subsea connection system of claim 7, the tubular members of said first and second poppet assemblies being resiliently and slidably mounted in the respective interior passageways of said first and second subsea flowlines.

9. The subsea connection system of claim 8, each of the tubular members being movable between an outward position and an inward position, each of the tubular members having an end extending outwardly beyond an end of the respective stems when said first and second subsea flowlines are not connected.

10. The subsea connection system of claim 9, and outward end of said tubular channel of said first poppet assembly bearing against an outward end of said another tubular channel of said second poppet assembly when said first subsea flowline is connected to said second subsea flowline.

11. The subsea connection system of claim 8, said another tubular channel of said second poppet assembly and an end of said another valve stem of said second poppet assembly extending outwardly beyond an end of said hub.

12. The subsea connection system of claim 7, each of the tubular members of said first and second poppet assemblies having a spring that urges an end of the tubular member outwardly.

* * * * *